(12) United States Patent
Thomas et al.

(10) Patent No.: US 10,432,545 B2
(45) Date of Patent: Oct. 1, 2019

(54) APPARATUS, SYSTEM, AND METHOD FOR TIMELY DETECTION OF INCREASES IN THE MAXIMUM TRANSMISSION UNIT OF PATHS WITHIN NETWORKS

(71) Applicant: Juniper Networks, Inc., Sunnyvale, CA (US)

(72) Inventors: Reji Thomas, Bangalore (IN); Vivek Ramesh, Kottayam (IN); Samson P. Ninan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 108 days.

(21) Appl. No.: 15/041,736

(22) Filed: Feb. 11, 2016

(65) Prior Publication Data

US 2017/0187638 A1 Jun. 29, 2017

(30) Foreign Application Priority Data

Dec. 28, 2015 (IN) .......................... 4297/DEL/2015

(51) Int. Cl.
*H04L 12/805* (2013.01)
*H04L 12/26* (2006.01)

(52) U.S. Cl.
CPC .............. *H04L 47/36* (2013.01); *H04L 43/10* (2013.01); *H04L 43/0864* (2013.01)

(58) Field of Classification Search
CPC ............................ H04L 47/36; H04L 43/0864
See application file for complete search history.

(56) References Cited

U.S. PATENT DOCUMENTS

| 9,742,639 | B1* | 8/2017 | Zhang | ................. H04L 41/0853 |
| 2003/0039212 | A1* | 2/2003 | Lloyd | ................. H04L 41/0823 |
| | | | | 370/235 |
| 2003/0185208 | A1* | 10/2003 | Lee | ......................... H04L 45/12 |
| | | | | 370/389 |

(Continued)

OTHER PUBLICATIONS

IP fragmentation, https://en.wikipedia.org/wiki/IP_fragmentation, as accessed Nov. 25, 2015, Wikipedia, (Dec. 15, 2005).

(Continued)

*Primary Examiner* — Alex Skripnikov
*Assistant Examiner* — Sharmin Chowdhury
(74) *Attorney, Agent, or Firm* — FisherBroyles, LLP

(57) ABSTRACT

The disclosed apparatus may include (1) at least one communication port that facilitates communication between a source computing device and a destination computing device via a path within a network and (2) a processing unit communicatively coupled to the communication port, wherein the processing unit (A) monitors the network for any changes to the path that potentially affect a maximum transmission unit of the path, (B) detects, while monitoring the network, a change to at least one hop included in the path, and then in response to detecting the change to the hop, (C) identifies a packet size that corresponds to the maximum transmission unit of the path, and (D) tests the path for an increase in the maximum transmission unit by transmitting a packet whose size is larger than the packet size that corresponds to the maximum transmission unit. Various other apparatuses, systems, and methods are also disclosed.

20 Claims, 7 Drawing Sheets

(56) References Cited

U.S. PATENT DOCUMENTS

| | | | |
|---|---|---|---|
| 2004/0001444 A1* | 1/2004 | Sadot | H04L 47/10 370/252 |
| 2004/0218550 A1* | 11/2004 | Kim | H04L 47/36 370/254 |
| 2005/0041635 A1 | 2/2005 | Chung et al. | |
| 2006/0274791 A1* | 12/2006 | Garcia | H04L 43/0864 370/508 |
| 2007/0230369 A1* | 10/2007 | McAlpine | H04L 45/00 370/256 |
| 2009/0316574 A1* | 12/2009 | Winter | H04L 45/00 370/225 |
| 2010/0128606 A1 | 5/2010 | Patel et al. | |
| 2011/0103399 A1 | 5/2011 | Bransi et al. | |
| 2011/0305143 A1* | 12/2011 | Gray | H04L 45/02 370/242 |
| 2014/0043992 A1* | 2/2014 | Le Pallec | H04L 43/10 370/252 |
| 2015/0071067 A1* | 3/2015 | Martin | G06F 11/2002 370/235 |

OTHER PUBLICATIONS

Traceroute, https://en.wikipedia.org/wiki/Traceroute, as accessed Nov. 25, 2015, Wikipedia, (Feb. 24, 2004).

Stefano Gridelli, Troubleshooting MTU Issues, https://netbeez.net/2014/08/12/troubleshooting-mtu-issues/, NetBeez, Aug. 12, 2014.

\* cited by examiner

Apparatus
100 a# APPARATUS, SYSTEM, AND METHOD FOR TIMELY DETECTION OF INCREASES IN THE MAXIMUM TRANSMISSION UNIT OF PATHS WITHIN NETWORKS

BACKGROUND

The maximum transmission unit of a path within a network may change over time. In this context, the maximum transmission unit may represent and/or refer to the size of the largest packet capable of being transmitted from a source to a destination via a path within a network. For example, a path may facilitate communication between a source and a destination within a network. In this example, the path may include and/or involve a series of hops. In the event that the source transmits a packet whose size is larger than the maximum transmission unit of a hop included in the path, the hop may drop the packet and send back an error message indicating that the packet is too big (sometimes referred to as a "Packet Too Big" message).

In a traditional approach to detecting increases in the maximum transmission unit of a path, a source may periodically transmit a packet whose size is larger than the previously determined maximum transmission unit of the path. For example, the source may transmit a larger packet every 10 minutes or so in an effort to determine whether the maximum transmission unit of the path has recently increased. In the event that the source does not receive a "Packet Too Big" message in response, the source may determine that the maximum transmission unit of the router has increased. As a result, the source may begin transmitting data over the path using larger packets.

Unfortunately, since this traditional approach involves testing on a periodic basis, the source may be unable to detect increases in the maximum transmission unit at or near the time they take place. For example, the source may fail to detect an increase in the maximum transmission unit of the path for nearly 10 minutes after the occurrence. The instant disclosure, therefore, identifies and addresses a need for improved apparatuses, systems, and methods for timely detection of increases in the maximum transmission unit of paths within networks.

SUMMARY

As will be described in greater detail below, the instant disclosure generally relates to apparatuses, systems, and methods for timely detection of increases in the maximum transmission unit of paths within networks. In one example, an apparatus for accomplishing such a task may include (1) at least one communication port that facilitates communication between a source computing device and a destination computing device via a path within a network and (2) a processing unit communicatively coupled to the communication port, wherein the processing unit (A) monitors the network for any changes to the path that potentially affect a maximum transmission unit of the path, (B) detects, while monitoring the network, a change to at least one hop included in the path, and then in response to detecting the change to the hop, (C) identifies a packet size that corresponds to the maximum transmission unit of the path, and (D) tests the path for an increase in the maximum transmission unit of the path by transmitting a packet whose size is larger than the packet size that corresponds to the maximum transmission unit of the path.

A corresponding method may include (1) monitoring a network for any changes that potentially affect a maximum transmission unit of a path that facilitates communication between a source computing device and a destination computing device within the network, (2) detecting, while monitoring the network, a change to at least one hop included in the path, and then in response to detecting the change to the hop, (3) identifying a packet size that corresponds to the maximum transmission unit of the path, and (4) testing the path for an increase in the maximum transmission unit of the path by transmitting a packet whose size is larger than the packet size that corresponds to the maximum transmission unit of the path.

Similarly, a network device incorporating the above-described apparatus may include (1) at least one communication port that facilitates communication between the network device and a destination computing device via a path within a network and (2) a processing unit communicatively coupled to the communication port, wherein the processing unit (A) monitors the network for any changes to the path that potentially affect a maximum transmission unit of the path by using a traceroute tool that facilitates tracing the path on a periodic basis, (B) detects, while monitoring the network using the traceroute tool, a change to at least one hop included in the path, and then in response to detecting the change to the hop, (C) identifies a packet size that corresponds to the maximum transmission unit of the path, and (D) tests the path for an increase in the maximum transmission unit of the path by transmitting a packet whose size is larger than the packet size that corresponds to the maximum transmission unit of the path.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
FIG. 1 is a block diagram of an exemplary apparatus for timely detection of increases in the maximum transmission unit of paths within networks.
Figure 1:
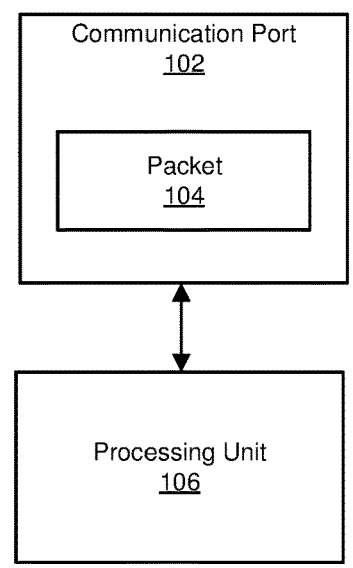

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for timely detection of increases in the maximum transmission unit of paths within networks. As will be explained in greater detail below, embodiments of the instant disclosure may enable network devices to detect increases in the maximum transmission unit of paths in a more timely fashion than traditional approaches. For example, these embodiments may enable network devices to detect increases in the maximum transmission unit of the paths at the point in time that the paths experience topology changes instead of having to wait for the next polling cycle. As a result, these embodiments may enable the network devices to achieve more effective bandwidth utilization.

The term "path," as used herein, generally refers to any type or form of link and/or series of devices that facilitates communication and/or the flow of traffic between a source and a destination within a network. In one example, a path may include and/or represent a series of hops that carry packets from a source computing device to a destination computing device (or vice versa) within a network.

The term "maximum transmission unit," as used herein, generally refers to the largest packet size capable of being transmitted by a computing device and/or over a path without fragmentation. In one example, the maximum transmission unit of a path within an Internet Protocol version 4 (IPv4) network may range between 68 bytes and 64 kilobytes. Similarly, the maximum transmission unit of a path within an Internet Protocol version 6 (IPv6) network may range between 1280 bytes and 64 kilobytes. Alternatively, the maximum transmission unit of a path within an IPv6 network may reach up to 4 gigabytes by way of the jumbogram option.

The maximum transmission unit is often referred to as and/or abbreviated to "MTU", and the maximum transmission unit of a path is often referred to as Path MTU and/or abbreviated to "PMTU". In addition, the process of determining the PMTU of a path within a network is often referred to as PMTU discovery and/or abbreviated to "PMTUD".

The following will provide, with reference to FIG. 1, an example of an apparatus that facilitate timely detection of increases in the maximum transmission unit of paths within networks. The discussion corresponding to FIGS. 2, 3, and 4 will provide detailed descriptions of exemplary implementations of the apparatus from FIG. 1. The discussions corresponding to FIG. 5 will provide detailed descriptions of an exemplary record that identifies each hop included in a path within a network. The discussion corresponding to FIG. 6 will provide a detailed description of an exemplary method for timely detection of increases in the maximum transmission unit of paths within networks. Finally, the discussion corresponding to FIG. 7 will provide numerous examples of systems that may incorporate the apparatus from FIG. 1.

FIG. 1 shows a block diagram of an exemplary apparatus 100 for timely detection of increases in the maximum transmission unit of paths within networks. Apparatus 100 generally represents any type or form of system, device, and/or mechanism that facilitates timely detection of increases in the maximum transmission unit of paths within networks. Examples of apparatus 100 include, without limitation, computing devices, network devices, routers, switches, hubs, modems, bridges, repeaters, gateways, multiplexers, network adapters, servers, portions of one or more of the same, variations or combinations of one or more of the same, or any other suitable apparatus.

As shown in FIG. 1, apparatus 100 may include a processing unit 106 with access to and/or in communication with a communication port 102. The term "processing unit," as used herein, generally refers to any type or form of physical hardware, circuit, device, and/or processor that performs certain Input/Output (I/O) operations and/or computing tasks. In one example, processing unit 106 may include and/or represent an integrated circuit whose configuration and/or infrastructure is at least partially fixed. Additionally or alternatively, processing unit 106 may represent an integrated circuit whose configuration and/or infrastructure is at least partially variable and/or programmable. Examples of processing unit 106 include, without limitation, processors, microprocessors, microcontrollers, Central Processing Units (CPUs), Field-Programmable Gate Arrays (FPGAs), Application-Specific Integrated Circuits (ASICs), software modules installed one or more of the same, portions of one or more of the same, variations or combinations of one or more of the same, or any other suitable processing unit.

The term "communication port," as used herein, generally refers to any type or form of physical interface, device, and/or housing that forms at least a portion of a connection, link, and/or path within a network. In some examples, communication port 102 may connect and/or link a source computing device with a destination computing device by way of a path within a network. Additionally or alternatively, communication port 102 may facilitate communication between a source computing device and a destination computing device via a path within a network. Examples of communication port 102 include, without limitation, Quad Small Form-factor Pluggable (QSFP) ports, Ethernet ports, Fibre Channel ports, optical ports, InfiniBand ports, CXP connectors, Multiple-Fiber Push-On/Pull-Off (MPO) connectors, XAUI ports, XFP transceivers, XFI interfaces, C Form-factor Pluggable (CFP) transceivers, variations or combinations of one or more of the same, or any other suitable communication ports. Although FIG. 1 illustrates a single communication port, apparatus 100 may include various communication ports in addition to communication port 102.

In some examples, apparatus 100 may achieve timely detection of increases in the maximum transmission unit of paths within a network by monitoring the networks for certain events that are likely to affect the maximum transmission unit of those paths. For example, increases in the maximum transmission unit may occur in response to changes in the topology of the network. Accordingly, apparatus 100 may achieve timely detection of increases in the maximum transmission unit of paths within the network by monitoring the network for any changes to the topology.

By monitoring the network in this way, apparatus 100 may be able to detect increases in the maximum transmission unit of paths based at least in part on event-driven triggers, as opposed to simply assuming such increases periodic polling cycles and waiting to determine whether any "Packet Too Big" messages are issued as a result. Examples of changes that are likely to affect the maximum transmission unit of paths include, without limitation, the addition of network devices to paths, the removal of network devices from paths, the replacement of network devices included in paths with other network devices, the reconfiguration of network devices included in paths, variations or combinations of one or more of the same, or any other suitable changes in the topology of a network.

In some examples, processing unit 106 may be communicatively coupled to communication port 102. In such examples, processing unit 106 may monitor a network that includes apparatus 100 for any changes to a path that communicatively links and/or connects apparatus 100 with a destination computing device via the path. These changes to the path may potentially affect the maximum transmission unit of the path. While monitoring the network in this way, processing unit 106 may detect a change to a hop included in the path.

As a specific example, this change may include and/or represent the addition of a hop to the path. In another example, this change may include and/or represent the removal of a hop from the path. In a further example, this change may include and/or represent the replacement of a hop included in the path with another hop. In an additional example, this change may include and/or represent the reconfiguration of a hop included in the path.

The term "hop," as used herein, generally refers to any type or form of computing device capable of forwarding network traffic and/or facilitating the flow of network traffic. Examples of hops include, without limitation, computing devices, network devices, routers, switches, hubs, modems, bridges, repeaters, gateways, multiplexers, network adapters, servers, portions of one or more of the same, variations or combinations of one or more of the same, or any other suitable hop.

In some examples, the detection of this change to the path may represent and/or amount to an event that triggers and/or initiates a test to determine whether the maximum transmission unit of the path has increased. For example, in response to detecting this change to the path, processing unit 106 may identify a packet size that corresponds to the maximum transmission unit of the path. Put another way, processing unit 106 may identify the maximum transmission unit of the path, which is often expressed as the number of bytes capable of being transmitted in a single a packet and/or frame over the path.

In the event that the network implements IPv4, this packet size may range anywhere from 68 bytes to 64 kilobytes. Alternatively, in the event that the network implements IPv6, this packet size may range anywhere from 1280 bytes to 64 kilobytes (or even up to 4 gigabytes with the jumbogram option).

Upon identifying the packet size corresponding to the maximum transmission unit of the path, processing unit 106 may test for an increase in the maximum transmission unit of the path by transmitting a packet 104 whose size is larger than the maximum transmission unit of the path. The term "packet," as used herein, generally refers to any type or form of package, encapsulation, abstraction, and/or object that includes one or more formatted units of data. Examples of packet 120 include, without limitation, IPv4 packets, IPv6 packets, User Data Protocol (UDP) packets, Internet Control Message Protocol (ICMP) packets, MultiProtocol Label Switching (MPLS) packets, Gateway-to-Gateway Protocol (GGP) packets, Transmission Control Protocol (TCP) packets, variations or combinations of one or more of the same, or any other suitable packet.

As a specific example, in the event that the last-determined maximum transmission unit of the path is 1400 bytes, processing unit 106 may transmit a packet whose size is 1500 bytes over the path. In one example, processing unit 106 may determine that the maximum transmission unit of the path has increased by verifying that no "Packet Too Big" message is issued by any of the hops included in the path in response to the larger packet. Additionally or alternatively, processing unit 106 may determine that the maximum transmission unit of the path has increased by verifying that the larger packet reaches its destination without undergoing fragmentation along the path or being dropped altogether.

Figure 2:
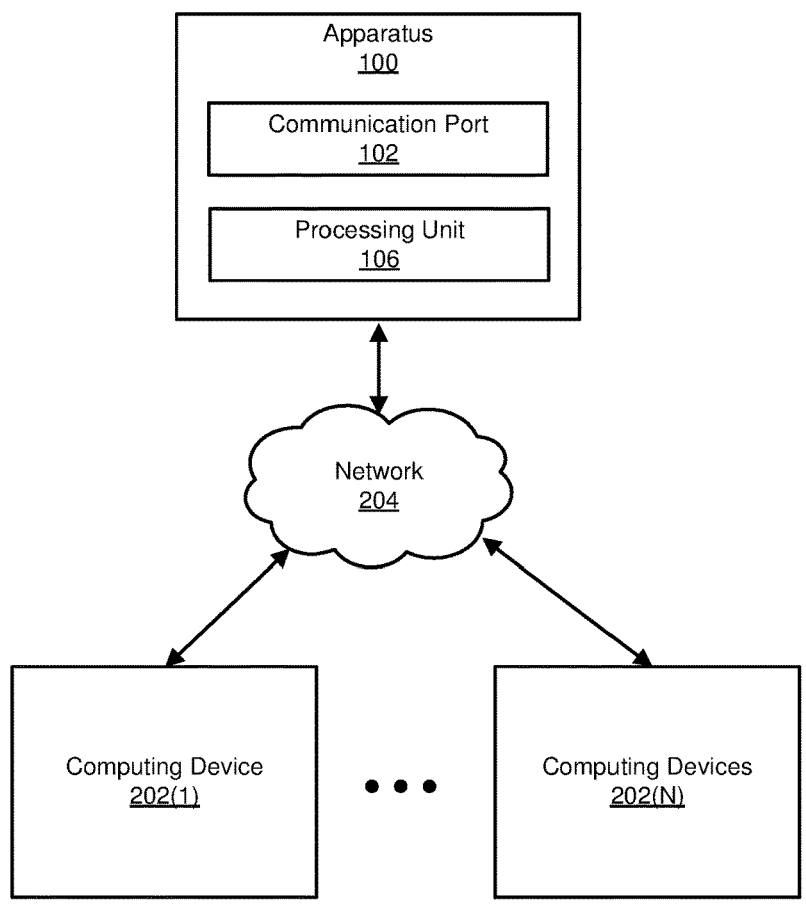
FIG. 2 is a block diagram of an exemplary implementation of an apparatus for timely detection of increases in the maximum transmission unit of paths within networks.

FIG. 2 shows a block diagram of an exemplary implementation 200 of apparatus 100 for timely detection of increases in the maximum transmission unit of paths within networks. As illustrated in FIG. 2, implementation 200 may include apparatus 100 in communication with computing devices 202(1)-(N) via a network 204. The term "network," as used herein, generally refers to any type or form of medium and/or architecture that facilitates communication or data transfer. In one example, network 204 may represent an IPv4 or IPv6 network that includes a plurality of computing devices.

Examples of network 204 include, without limitation, an IPv4 network, an IPv6 network, an MPLS network, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network. Network 204 may facilitate communication or data transfer using wireless or wired connections. Although apparatus 100 and computing devices 202(1)-(N) are illustrated as being external to network 204 in FIG. 2, apparatus 100 and/or computing devices 202(1)-(N) may alternatively represent portions of network 204 and/or be included in network 204.

The term "computing device," as used herein, generally refers to any type or form of device capable of reading computer-executable instructions. In some examples, computing devices 202(1)-(N) may include and/or represent network devices that send and/or receive data packets. Examples of computing devices 202(1)-(N) include, without limitation, network devices, routers, switches, modems, gateways, hubs, repeaters, servers, laptops, desktops, mobile devices, internet-enabled televisions, and/or BLU-RAY players, portions of one or more of the same, variations or combinations of one or more of the same, or any other suitable types of computing devices.

In some examples, computing devices 202(1)-(N) may facilitate network traffic between other computing devices. For example, computing devices 202(1)-(N) may forward certain network traffic to end-point and/or destination devices that are not illustrated in FIG. 2. Alternatively, computing devices 202(1)-(N) may include and/or represent end-point and/or destination computing devices.

Figure 3:
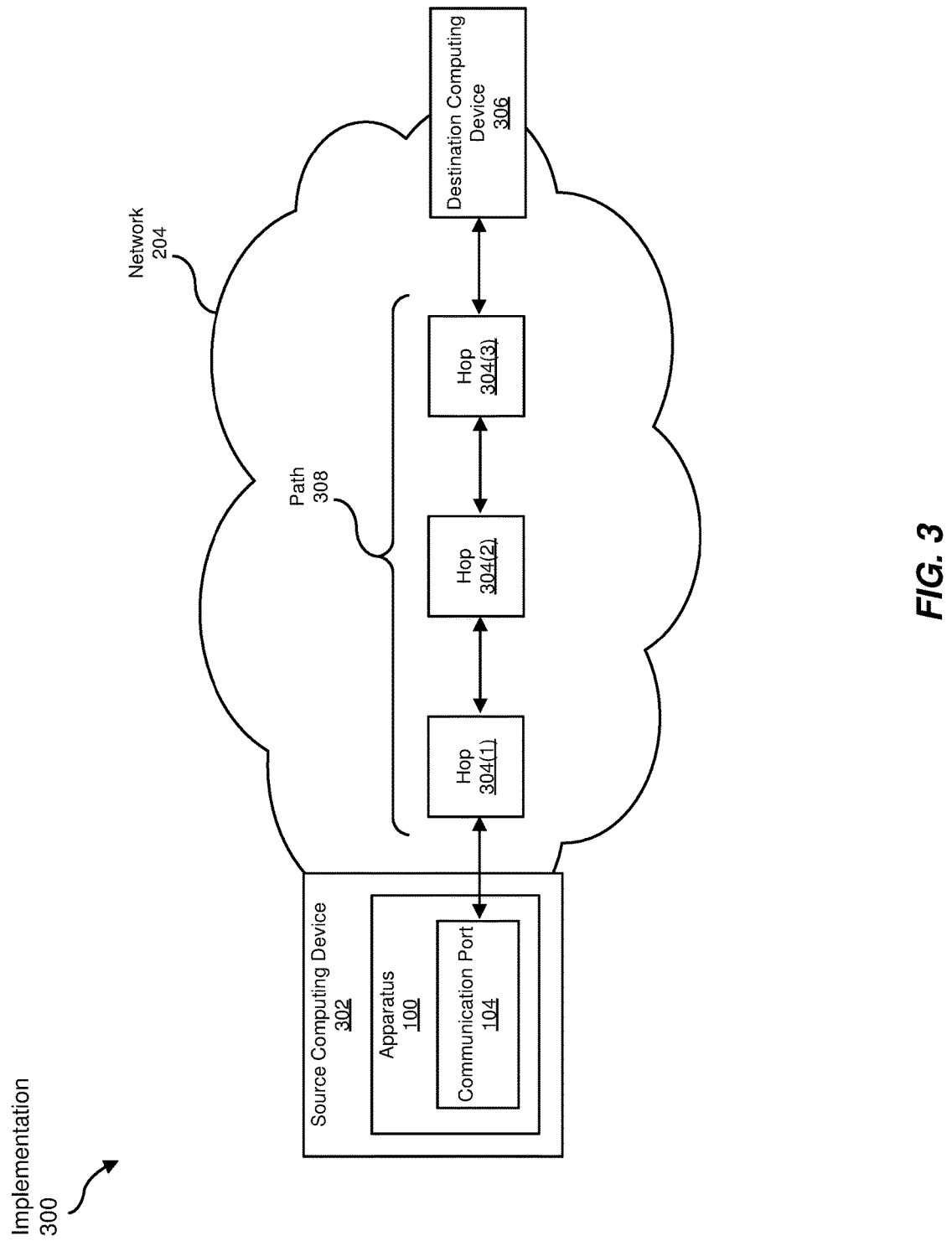
FIG. 3 is a block diagram of an additional exemplary implementation of an apparatus for timely detection of increases in the maximum transmission unit of paths within networks.

FIG. 3 shows an additional exemplary implementation 300 for timely detection of increases in the maximum transmission unit of paths within networks. As illustrated in FIG. 3, implementation 300 may include a source computing device 302 in communication with a destination computing device 306 via a path 308 within network 204. In this example, source computing device 302 may include and/or represent apparatus 100. In addition, path 308 may include and/or represent hops 304(1), 304(2), and 304(3). Although FIG. 3 illustrates only hops 304(1)-(3) for purposes of simplicity and readability, alternative embodiments may involve paths that include any number of hops (whether more or less).

In some examples, processing unit 106 may, as part of source computing device 302, monitor network 204 for any changes to path 308 that potentially affect the maximum transmission unit of path 308. In one example, processing unit 106 may create and/or maintain a record that identifies each hop included in path 308 to use as a reference. For example, processing unit 106 may transmit a packet that makes a round trip from source computing device 302 to destination computing device 306 and then back to source computing device 302 via path 308. In this example, processing unit 106 may initiate transmission of this packet at a specific point in time. As the packet returns to source computing device 302, processing unit 106 may identify hops 304(1)-(3) as the traversed path based at least in part on the returning packet (e.g., the packet's header information). Processing unit 106 may then create a record 500 in FIG. 5 that identifies hops 304(1)-(3) as the path traversed by the packet.

In one example, processing unit 106 may perform this kind of monitoring by using a traceroute tool. For example, processing unit 106 may engage a traceroute tool by issuing a "traceroute" command to an operating system of source computing device 302. In response to this command, the traceroute tool may initiate transmission of the packet that traverses path 308 and returns information that identifies hops 304(1)-(3) as the traversed path. Processing unit 106 may then determine which hops were traversed by the packet based at least in part on the information obtained from the traceroute tool. Examples of this traceroute tool include, without limitation, TRACEROUTE, TRACEROUTE(8), TRACERT, PATHPING, TRACEROUTE6, TRACERT6, variations or combinations of one or more of the same, or any other suitable traceroute tool.

In one example, processing unit 106 may detect a change to path 308 by transmitting another packet that makes a round trip from source computing device 302 to destination computing device 306 and then back to source computing device 302. In this example, processing unit 106 may initiate transmission of this other packet at a subsequent point in time by engaging the traceroute tool. As the other packet returns to source computing device 302, processing unit 106 may determine that path 308 has changed in one way or another since the specific point in time by comparing the hops traversed by the other packet with record 500.

As a specific example, processing unit 106 may determine that another hop (not necessarily illustrated in FIG. 3) was added to path 308 after the specific point in time. In another example, processing unit 106 may determine that one of hops 304(1)-(3) was removed from path 308 after the specific point in time. In a further example, processing unit 106 may determine that one of hops 304(1)-(3) was replaced by another hop (not necessarily illustrated in FIG. 3) after the specific point in time. In an additional example, processing unit 106 may determine that one of hops 304(1)-(3) was reconfigured, modified, and/or shut down after the specific point in time.

In response to detecting the change to one of hops 304(1)-(3), processing unit 106 may test path 308 for any increase in the maximum transmission unit. For example, processing unit 106 may identify a packet size that corresponds to the maximum transmission unit. As a specific example, the maximum transmission unit of path 308 may be represented as a packet size of 1400 bytes.

Upon identifying this packet size, processing unit 106 may transmit a packet whose size is larger than the packet size corresponding to the maximum transmission unit over path 308. For example, in the event that the maximum transmission unit of path 308 has been identified as 1400 bytes, processing unit 106 may transmit a packet of 1500 bytes over path 308. By transmitting this larger packet in response to detecting the change to one of hops 304(1)-(3), processing unit 106 may determine whether the detected change caused an increase of 100 or more bytes in the maximum transmission unit of the path.

In one example, processing unit 106 may determine that the maximum transmission unit of the path has increased based at least in part on the test. For example, processing unit 106 may wait a certain amount of time after having transmitted the packet for a message indicating that the size of the packet is excessively large (e.g., a "Packet Too Big" message) or a message indicating that the packet was fragmented while traversing the path. In the event that no such message is delivered by any of hops 304(1)-(3) to source computing device 302 within that amount of time, processing unit 106 may determine that the maximum transmission unit of path 308 has increased as a result of the detected change.

In response to the increase in the maximum transmission unit of path 308, processing unit 106 may transmit network traffic from source computing device 302 to destination computing device 306 via the path using packets whose size is consistent with the increased maximum transmission unit. For example, in the event that the maximum transmission unit has increased to 1500 bytes, processing unit 106 may transmit network traffic to destination computing device 306 using packets that each include 1500 bytes.

In one example, processing unit 106 may determine that the maximum transmission unit of the path has not increased based at least in part on the test. For example, processing unit 106 may detect a message (e.g., a "Packet Too Big" message) issued by one of hops 304(1)-(3) in response to receiving the larger packet. This message may indicate that the size of the packet is excessively large and/or indicate that the hop fragmented the packet on its way to the destination.

As a result of no increase in the maximum transmission unit of path 308, processing unit 106 may continue transmitting network traffic from source computing device 302 to destination computing device 306 via the path using packets whose size is consistent with the last-determined maximum transmission unit. For example, in the event that the maximum transmission unit remained at 1400 bytes despite the detected change to the path, processing unit 106 may continue transmitting network traffic to destination computing device 306 using packets that each include 1400 bytes.

Figure 4:
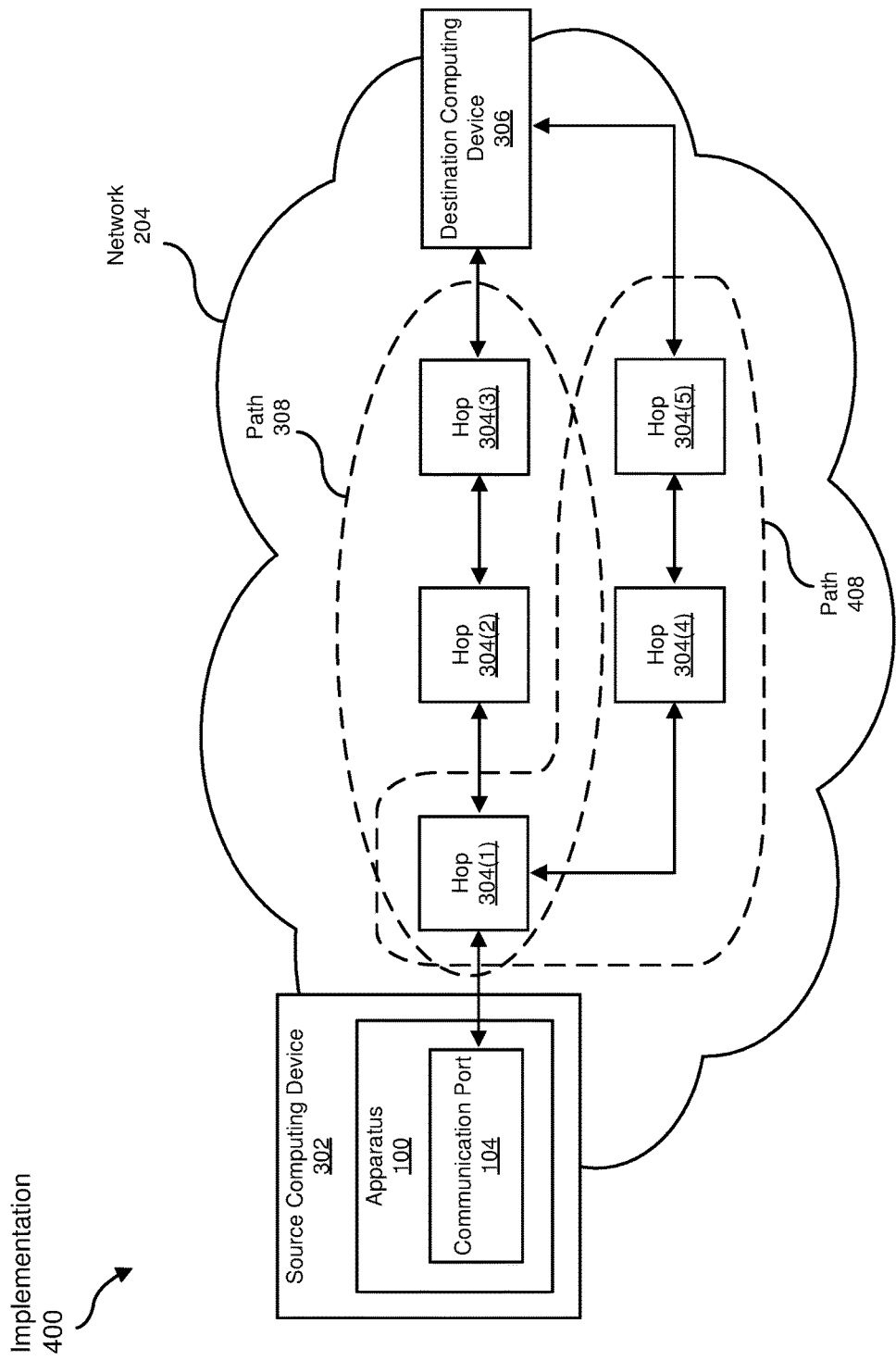
FIG. 4 is a block diagram of an additional exemplary implementation of an apparatus for timely detection of increases in the maximum transmission unit of paths within networks.
Figure 5:
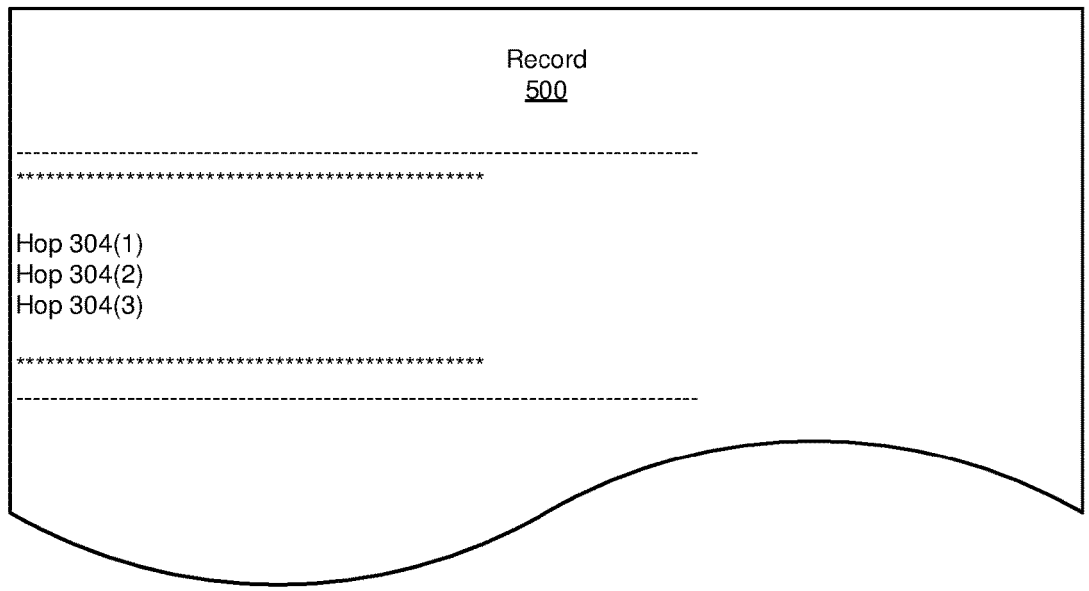
FIG. 5 is an illustration of an exemplary record that identifies each hop included in a path within a network.

FIG. 4 shows an additional exemplary implementation 400 for timely detection of increases in the maximum transmission unit of paths within networks. As illustrated in FIG. 4, implementation 400 may include source computing device 302 in communication with destination computing device 306 via path 308 and a path 408 within network 204. In this example, source computing device 302 may include and/or represent apparatus 100. In this example, path 408 may include and/or represent hops 304(1), 304(4), and 304(5). Paths 308 and 408 may collectively perform load-balancing on network traffic transmitted from source computing 302 to destination computing device 306. The term "load-balancing," as used herein, generally refers to any type or form of process, procedure, and/or operation that distributes and/or allocates network traffic destined for the same intermediate target and/or final destination across paths that include different network devices.

In one example, processing unit 106 may enable hops 304(1)-(5) to collectively perform load-balancing on network traffic transmitted from source computing device 302 to destination computing device 306. For example, processing unit 106 may direct certain packets along path 308 and other packets along path 408 as they leave source computing device 302. In this example, the packets may include headers that identify their respective paths.

In some examples, processing unit 106 may monitor network 204 for any changes that potentially affect the maximum transmission unit of path 308 and/or path 408. While monitoring network 204 in this way, processing unit 106 may detect one or more of hops 304(1)-(5). As a result, processing unit 106 may identify a packet size that corresponds to the maximum transmission unit of the path that experienced the change. Processing unit 106 may then test that path for an increase in its maximum transmission unit by transmitting a packet whose size is larger than the packet size that corresponds to the maximum transmission unit of the path.

As a specific example, processing unit 106 may detect a change in topology along path 408 within network 204. In response to detecting this change, processing unit 106 may identify 1600 bytes as the maximum transmission unit of path 408. Processing unit 106 may then test path 408 for an increase in its maximum transmission unit by transmitting a packet of 1630 bytes to destination computing device 306 along path 408.

As explained above in connection with FIGS. 1-5, a source device may perform PMTU discovery only when triggered by a change to the topology of a network, as opposed to performing such discovery on a periodic basis. For example, the source device may monitor route changes using traceroute messages. While monitoring route changes in this way, the source device may detect a route change that triggers a calculation of the PMTU. In other words, the source device may initiate a recalculation of the PMTU in response to detecting a route change via traceroute messages.

The PMTU calculation may take into account any load-balancing performed along the path to a destination device. For example, the source device may adjust the calculation of the PMTU to account for multiple paths traversed by network traffic originating from the source device and arriving at the destination device. The source device may adjust the calculation of the PMTU by identifying any differences in the set of hops included in the multiple paths from before and after the detected route change.

Continuing with this example, since a change in the topology may result in increased PMTU, decreased PMTU, and/or the same PMTU, the source device may need to test whether or not the PMTU actually increased as a result of the change. For example, the source device may identify the last-determined PMTU for the path that experienced the detected change. The source device may then transmit a packet whose size is larger than the last-determined PMTU over that path to determine whether its PMTU increased as a result of the detected change to the topology.

If any of the hops along the path generate a "Packet Too Big" message in response to the larger packet, the source device may determine that the PMTU did not increase as a result of the detected change to the topology. Moreover, if any of the hops along the path generate a "Packet Too Big" message in response to a packet of the same size as the last-determined PMTU, the source device may determine that the PMTU actually decreased as a result of the detected change to the topology. Additionally or alternatively, the source device may use a delta soak time to help distinguish between an increase and a decrease in the PMTU. If one of the hops along the path generates a "Packet Too Big" message in response to a larger packet but not in response to a packet of the same size as the last-determined PMTU, the source device may determine that the PMTU remained the same despite the detected change to the topology.

Figure 6:
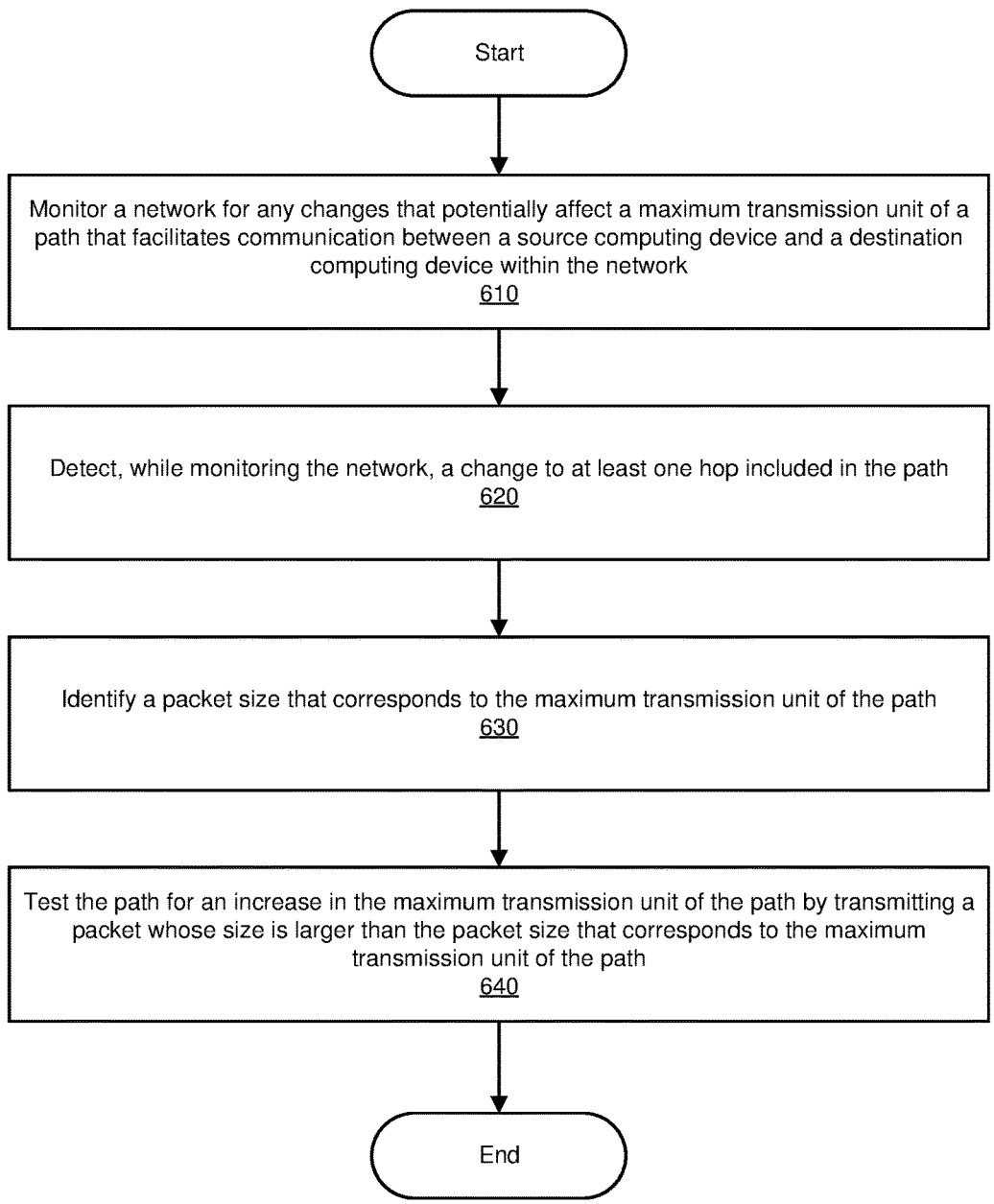
FIG. 6 is a flow diagram of an exemplary method for timely detection of increases in the maximum transmission unit of paths within networks.

FIG. 6 is a flow diagram of an exemplary method 600 for timely detection of increases in the maximum transmission unit of paths within networks. Method 600 may include the step of monitoring a network for any changes that potentially affect the maximum transmission unit of the path by transmitting a packet whose size is larger than the packet size that corresponds to the maximum transmission unit of the path (610). This monitoring step may be performed in a variety of ways. For example, processing unit 106 may, as part of a network device, create a record that identifies each hop included in the path by checking one or more traceroute messages. Additionally or alternatively, processing unit 106 may compare subsequent traceroute messages with the record to determine whether the path has experienced any changes to its topology.

Returning to FIG. 6, method 600 may also include the step of detecting, while monitoring the network, a change to at least one hop included in the path (620). This detecting step may be performed in a variety of ways. For example, processing unit 106 may, as part of the network device, detect a change to a hop included in the path while monitoring the network based at least in part on the traceroute messages. In one example, processing unit 106 may detect this change by determining that a hop has been added to the path, removed from the path, replaced within the path, and/or reconfigured within the path.

Returning to FIG. 6, method 600 may additionally include the step of identifying a packet size that corresponds to the maximum transmission unit of the path (630). This identifying step may be performed in a variety of ways. For example, processing unit 106 may, as part of the network device, identify the packet size based at least in part on the number of bytes expressed as the maximum transmission unit of the path. In one example, processing unit 106 may initiate this identification in response to and/or as a result of detecting the change to the hop.

Returning to FIG. 6, method 600 may further include the step of testing the path for an increase in the maximum transmission unit of the path by transmitting a packet whose size is larger than the packet size that corresponds to the maximum transmission unit of the path (640). This testing step may be performed in a variety of ways. For example, processing unit 106 may, as part of the network device, transmit a packet whose size is larger than the path's maximum transmission unit over the path. In one example, processing unit 106 may initiate this testing in response to and/or as a result of detecting the change to the hop.

Processing unit 106 may wait a certain amount of time after having transmitted the packet for a message indicating that the size of the packet is excessively large (e.g., a "Packet Too Big" message) or a message indicating that the packet was fragmented while traversing the path. In the event that no such message is delivered by any of the hops within that amount of time, processing unit 106 may determine that the maximum transmission unit of the path has increased as a result of the detected change to the hop. However, in the event that such a message is delivered by one of the hops within that amount of time, processing unit 106 may determine that the maximum transmission unit of the path has not increased as a result of the detected change to the hop.

Figure 7:
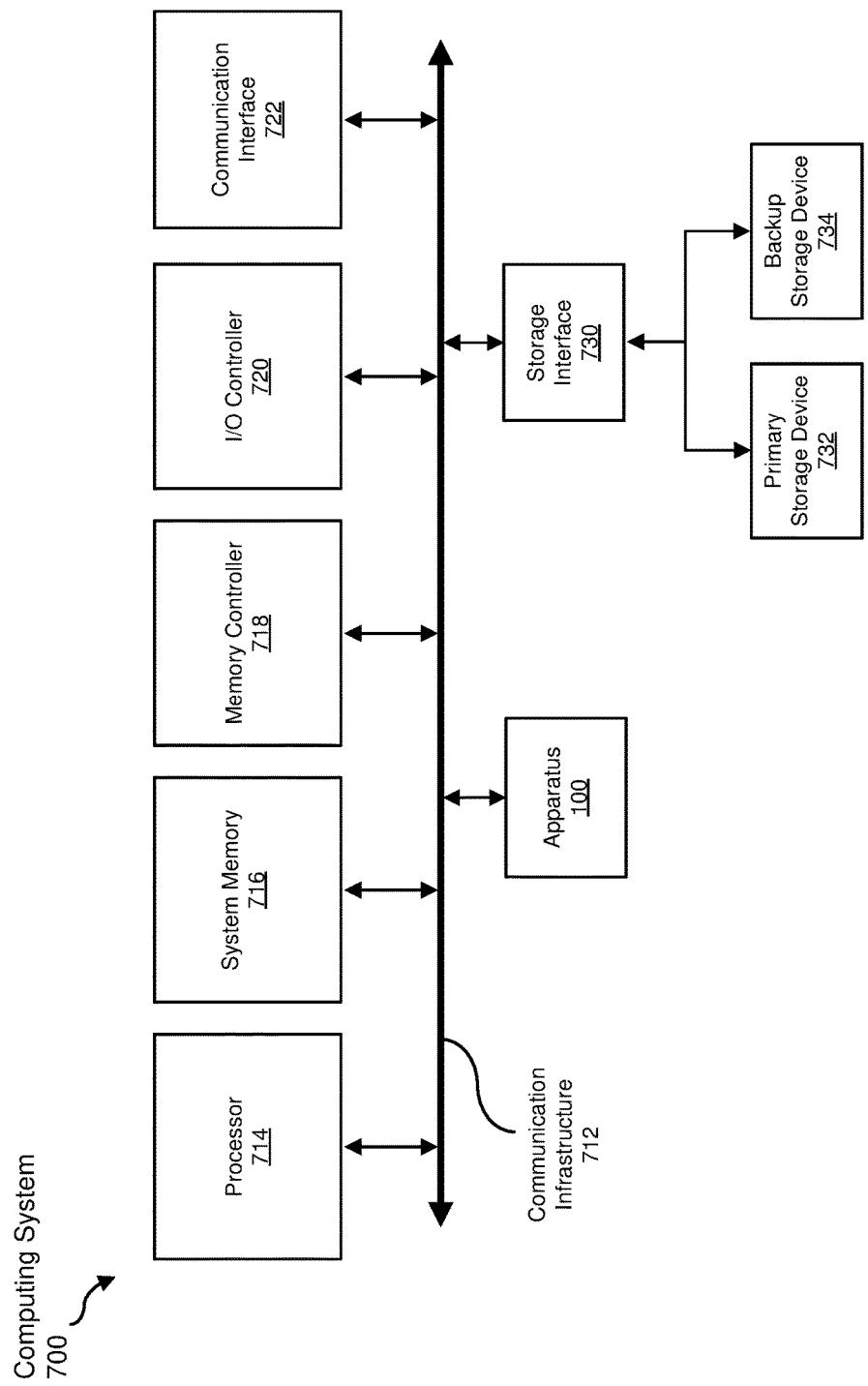
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 6. All or a portion of computing system 700 may also perform and/or be a means for performing and/or implementing any other steps, methods, or processes described and/or illustrated herein. In one example, computing system 700 may include apparatus 100 from FIG. 1.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
   at least one communication port that facilitates communication between a source computing device and a destination computing device via a path within a network; and
   a processing unit communicatively coupled to the communication port, wherein the processing unit:
     monitors the network for any changes to the path that potentially affect a maximum transmission unit of the path by:
       engaging a traceroute tool to initiate transmission of packets that trace the path and return information that identifies each hop included in the path; and
       creating a record that identifies each hop included in the path at a specific point in time;
     detects, while monitoring the network, a change to at least one hop included in the path by:
       transmitting, by way of the traceroute tool, a packet that makes a round trip from the source computing device to the destination computing device via the path and then back to the source computing device;
       identifying, within a header of the packet that made the round trip, each hop included in the path; and
       determining, by comparing at least one hop listed in the packet with the record, that the path has changed since the specific point in time; and
     in response to detecting the change to the hop, initiating a maximum transmission unit discovery process by:
       identifying a packet size that corresponds to the maximum transmission unit of the path; and
       testing the path for an increase in the maximum transmission unit of the path by transmitting a test packet whose size is larger than the packet size that corresponds to the maximum transmission unit of the path.

2. The apparatus of claim 1, wherein the processing unit creates the record by:
   transmitting, at a specific point in time, an additional packet that makes an additional round trip from the source computing device to the destination computing device and then back to the source computing device; and
   creating the record based at least in part on the additional packet that makes the additional round trip.

3. The apparatus of claim 2, wherein the processing unit transmits the packet and the additional packet by issuing a traceroute command to an operating system, wherein the traceroute command causes the operating system to engage the traceroute tool such that the traceroute tool directs the packet to make the round trip and the additional packet to make the additional round trip.

4. The apparatus of claim 1, wherein the processing unit:
   determines that the maximum transmission unit of the path has increased based at least in part on the test of the path; and
   transmitting network traffic from the source computing device to the destination computing device via the path using packets whose size is consistent with the increased maximum transmission unit.

5. The apparatus of claim 4, wherein the processing unit determines that the maximum transmission unit of the path has increased by:
   waiting, after having transmitted the test packet, a certain amount of time for a message indicating that the size of the test packet is excessively large; and
   determining that no message indicating that the size of the test packet is excessively large was delivered within the certain amount of time after having transmitted the test packet.

6. The apparatus of claim 1, wherein the processing unit:
   determines that the maximum transmission unit of the path has not increased based at least in part on the test of the path; and
   transmitting network traffic from the source computing device to the destination computing device via the path using packets whose size is consistent with the increased maximum transmission unit.

7. The apparatus of claim 6, wherein the processing unit determines that the maximum transmission unit of the path has not increased by detecting, after having transmitted the test packet, a message indicating that the size of the test packet is excessively large.

8. The apparatus of claim 1, wherein the processing unit detects the change to the hop included in the path by at least one of:
   detecting an addition of a network device to the path;
   detecting a removal of a network device from the path; and
   detecting a replacement of a network device included in the path with another network device.

9. The apparatus of claim 1, wherein:
   the communication port facilitates communication between the source computing device and the destination computing device via a plurality of paths within the network; and
   the processing unit:
     enables hops included in the plurality of paths to perform load-balancing on network traffic transmitted from the source computing device to the destination computing device;
     monitors the network for any changes that potentially affect the maximum transmission unit of any of the plurality of paths; and
     detects, while monitoring the network, a change to at least one hop included in at least one of the plurality of paths.

10. A method comprising:
    monitoring a network for any changes that potentially affect a maximum transmission unit of a path that facilitates communication between a source computing device and a destination computing device within a network;
    engaging a traceroute tool to initiate transmission of packets that trace the path and return information that identifies each hop included in the path;
    creating a record that identifies each hop included in the path at a specific point in time;
    detecting, while monitoring the network, a change to at least one hop included in the path by:
      transmitting, by way of the traceroute tool, a packet that makes a round trip from the source computing device to the destination computing device via the path and then back to the source computing device;
      identifying, within a header of the packet that made the round trip, each hop included in the path; and determining, by comparing at least one hop listed in the packet with the record, that the path has changed since the specific point in time; and in response to detecting the change to the hop, initiating a maximum transmission unit discovery process by:
identifying a packet size that corresponds to the maximum transmission unit of the path; and
testing the path for an increase in the maximum transmission unit of the path by transmitting a test packet whose size is larger than the packet size that corresponds to the maximum transmission unit of the path.

11. The method of claim 10, wherein creating the record comprises:
transmitting, at a specific point in time, an additional packet that makes an additional round trip from the source computing device to the destination computing device and then back to the source computing device; and
creating the record based at least in part on the additional packet that makes the additional round trip.

12. The method of claim 11, wherein transmitting the packet and the additional packet comprises issuing a traceroute command to an operating system, wherein the traceroute command causes the operating system to engage the traceroute tool such that the traceroute tool directs the packet to make the round trip and the additional packet to make the additional round trip.

13. The method of claim 10, wherein testing the path for the increase in the maximum transmission unit of the path comprises:
determining that the maximum transmission unit of the path has increased based at least in part on the test of the path; and
transmitting network traffic from the source computing device to the destination computing device via the path using packets whose size is consistent with the increased maximum transmission unit.

14. The method of claim 13, wherein determining that the maximum transmission unit of the path has increased comprises:
waiting, after having transmitted the test packet, a certain amount of time for a message indicating that the size of the test packet is excessively large; and
determining that no message indicating that the size of the test packet is excessively large was delivered within the certain amount of time after having transmitted the test packet.

15. The method of claim 10, wherein testing the path for the increase in the maximum transmission unit of the path comprises:
determines that the maximum transmission unit of the path has not increased based at least in part on the test of the path; and
transmitting network traffic from the source computing device to the destination computing device via the path using packets whose size is consistent with the increased maximum transmission unit.

16. The method of claim 15, wherein determining that the maximum transmission unit of the path has not increased comprises detecting, after having transmitted the test packet, a message indicating that the size of the test packet is excessively large.

17. The method of claim 10, wherein detecting the change to the hop included in the path comprises at least one of:

detecting an addition of a network device to the path;
detecting a removal of a network device from the path; and
detecting a replacement of a network device included in the path with another network device.

18. The method of claim 10, further comprising:
facilitating, via a communication port, communication between the source computing device and the destination computing device via a plurality of paths within the network;
enabling hops included in the plurality of paths to perform load-balancing on network traffic transmitted from the source computing device to the destination computing device;
monitoring the network for any changes that potentially affect the maximum transmission unit of any of the plurality of paths; and
detecting, while monitoring the network, a change to at least one hop included in at least one of the plurality of paths.

19. A network device comprising:
at least one communication port that facilitates communication between the network device and a destination computing device via a path within a network; and
a processing unit communicatively coupled to the communication port, wherein the processing unit:
monitors the network for any changes to the path that potentially affect a maximum transmission unit of the path by:
engaging a traceroute tool to initiate transmission of packets that trace the path and return information that identifies each hop included in the path; and
creating a record that identifies each hop included in the path at a specific point in time;
detects, while monitoring the network using the traceroute tool, a change to at least one hop included in the path by:
transmitting, by way of the traceroute tool, a packet that makes a round trip from the network device to the destination computing device via the path and then back to the network computing device;
identifying, within a header of the packet that made the round trip, each hop included in the path; and
determining, by comparing at least one hop listed in the packet with the record, that the path has changed since the specific point in time; and
in response to detecting the change to the hop, initiating a maximum transmission unit discovery process by:
identifying a packet size that corresponds to the maximum transmission unit of the path; and
testing the path for an increase in the maximum transmission unit of the path by transmitting a packet whose size is larger than the packet size that corresponds to the maximum transmission unit of the path.

20. The network device of claim 19, wherein the processing unit:
determines that the maximum transmission unit of the path has increased based at least in part on the test of the path; and
transmitting network traffic from the network device to the destination computing device via the path using packets whose size is consistent with the increased maximum transmission unit.

\* \* \* \* \*